(12) United States Patent
Choi et al.

(10) Patent No.: US 12,063,056 B2
(45) Date of Patent: Aug. 13, 2024

(54) INTERFERENCE CANCELLATION IN A TRANSCEIVER DEVICE

(71) Applicant: MaxLinear, Inc., Carlsbad, CA (US)

(72) Inventors: Yang-Seok Choi, Portland, OR (US); Tariq Qureshi, Hillsboro, OR (US)

(73) Assignee: MaxLinear, Inc., Carlsbad, CA (US)

( * ) Notice: Subject to any disclaimer, the term of this patent is extended or adjusted under 35 U.S.C. 154(b) by 173 days.

(21) Appl. No.: 17/597,597

(22) PCT Filed: Jun. 12, 2020

(86) PCT No.: PCT/US2020/037357
§ 371 (c)(1),
(2) Date: Jan. 12, 2022

(87) PCT Pub. No.: WO2021/011134
PCT Pub. Date: Jan. 21, 2021

(65) Prior Publication Data
US 2022/0416827 A1 Dec. 29, 2022

Related U.S. Application Data

(60) Provisional application No. 62/873,296, filed on Jul. 12, 2019.

(51) Int. Cl.
*H04B 1/10* (2006.01)
*H04B 1/40* (2015.01)
(Continued)

(52) U.S. Cl.
CPC ............. *H04B 1/1027* (2013.01); *H04B 1/40* (2013.01); *H04B 3/23* (2013.01); *H04B 3/32* (2013.01); *H04B 2001/1045* (2013.01)

(58) Field of Classification Search
None
See application file for complete search history.

(56) References Cited

U.S. PATENT DOCUMENTS

| 6,687,235 | B1 * | 2/2004 | Chu | ......................... H04B 3/23 |
| | | | | 379/406.01 |
| 6,904,110 | B2 * | 6/2005 | Trans | ...................... H04L 25/14 |
| | | | | 375/350 |

(Continued)

FOREIGN PATENT DOCUMENTS

| CN | 101379718 A | 3/2009 |
| CN | 105704339 A | 6/2016 |

(Continued)

OTHER PUBLICATIONS

International Search Report and Written Opinion in PCT/US2020/037357 mailed Sep. 21, 2020.

(Continued)

*Primary Examiner* — Pablo N Tran
(74) *Attorney, Agent, or Firm* — Buchalter; Jason W. Croft (57) ABSTRACT

The present disclosure is directed to improvements in interference mitigation for Adjacent Channel Leakage in wireline communication, and more specifically, but not exclusively, to improved kernel designs that can facilitate interference mitigation for Adjacent Channel Leakage in cable modem systems. Examples of the present disclosure provide an apparatus for a transceiver device that comprises interference cancellation circuitry configured to cancel interference caused by upstream signals in one or more upstream sub-bands on one or more downstream sub-bands based on a combination of a plurality of kernels. The interference is at least partially caused by non-linearities within a transmission circuitry of the transceiver device, the plurality of kernels representing the non-linearities within the transmission circuitry of the transceiver device. Each of the kernels comprises one or more associated terms, with each of the (Continued)

associated terms being in-band for at least one of the one or more downstream sub-bands.

21 Claims, 3 Drawing Sheets

(51) Int. Cl.
*H04B 3/23* (2006.01)
*H04B 3/32* (2006.01)

(56) References Cited

U.S. PATENT DOCUMENTS

| | | | | |
|---|---|---|---|---|
| 9,197,264 | B1* | 11/2015 | Yoo | H04B 1/1027 |
| 10,069,587 | B1* | 9/2018 | Rimini | H04B 1/525 |
| 10,374,781 | B2* | 8/2019 | Khandani | H04B 1/56 |
| 10,491,312 | B1* | 11/2019 | Shimizu | H04B 1/3822 |
| 10,797,739 | B1* | 10/2020 | Maleki | H04L 25/03019 |
| 11,101,841 | B2* | 8/2021 | Noest | H04B 1/525 |
| 2015/0311929 | A1* | 10/2015 | Carbone | H04B 1/123 |
| | | | | 455/78 |
| 2016/0294425 | A1* | 10/2016 | Hwang | H04B 1/1027 |
| 2018/0316523 | A1* | 11/2018 | Hewavithana | H04L 27/2691 |
| 2019/0068133 | A1* | 2/2019 | Gutman | H04L 27/368 |

FOREIGN PATENT DOCUMENTS

| | | |
|---|---|---|
| CN | 107645316 A | 1/2018 |
| WO | 2016010770 A1 | 1/2016 |
| WO | 2016040590 A1 | 3/2016 |

OTHER PUBLICATIONS

First Office Action in Chinese Application No. 2020800641536 mailed Mar. 11, 2023.

* cited by examiner

| Rx Filt | IC Filt | Case 1 Canc (dB) | Case 2 Canc (dB) |
|---|---|---|---|
| SF | SF | 41 | 31 |
| WF No FFT | SF | 20 | 20 |
| WF FFT | SF | 22 | 22 |
| SF | WF No FFT | 29 | 27 |
| SF | WF FFT | 20 | 19 |
| WF No FFT | WF No FFT | 15 | 13 |
| WF No FFT | WF FFT | 17 | 17 |
| WF FFT | WF No FFT | 22 | 22 |
| WF FFT | WF FFT | 26 | 25 |

Fig. 5

INTERFERENCE CANCELLATION IN A TRANSCEIVER DEVICE

FIELD

The present disclosure is directed to improvements in interference mitigation for Adjacent Channel Leakage in wireline communication, and more specifically, but not exclusively, to improved kernel designs that can facilitate interference mitigation for Adjacent Channel Leakage in cable modem systems.

BACKGROUND

The design of transceivers is a field of research and development. Due to the limitations of the available spectrum, upstream bands and downstream bands are being moved ever closed together, resulting in out-of-band leakage, in particular between transmissions of a transmitter and the signals being received by a receiver of the same device. In other systems, such issues may be addressed by using sharp receive band filters. Digital pre-distortion (DPD) is another method to limit the out-of-band leakage due to the PA (Power Amplifier). Additionally, digital self-interference cancelation techniques can be used as proposed in U.S. Pat. Nos. 9,698,862, 9,590,772, 9,667,292, and others.

BRIEF DESCRIPTION OF THE FIGURES

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled via one or more intervening elements. If two elements A and B are combined using an "or", this is to be understood to disclose all possible combinations, i.e. only A, only B as well as A and B, if not explicitly or implicitly defined otherwise. An alternative wording for the same combinations is "at least one of A and B" or "A and/or B". The same applies, mutatis mutandis, for combinations of more than two Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Various examples relate to new Kernel Designs and Interference Mitigation for Adjacent Channel Leakage in Cable-Modems.

The new DOCSIS (Data Over Cable Service Interface Specification) standard for cable modem specifies full duplex (FD) operation. Upcoming chipsets are expected to support this capability. In a Cable modem end, the operation is non-FD meaning upstream and downstream can be next to each other in frequency domain. However, there may be significant adjacent channel leakage (ACL) from the upstream bands to the downstream bands under different modes of operation, seriously limiting the performance. Canceling this leakage can mitigate these performance limitations. With the large bandwidth (600 MHz system bandwidth) and sampling rates (e.g., at least 4× oversampling of the 600 MHz signal for kernel generation), it is difficult to use existing polynomial kernels for cancelation due to the high sampling frequencies. Accordingly, various examples can employ kernels discussed herein for cancelation.

However, for existing techniques to achieve the desired level of leakage under the DOCSIS specifications, the Tx (Transmit) filters need to have sharp cut-offs. Such filters have upwards of 5000 taps, which is highly impractical given the complexity of design in the hardware.

A leakage suppression by DPD does not meet the DOCSIS requirements without additional cancelation. However, further DPD only address the PA non-linearity and not other non-linear impairments in the Tx and Rx (Receive) chain and the channel between cable modem and CMTS (Cable Modem Termination System).

Polynomial kernels with transformations as previously proposed (e.g., in U.S. Pat. No. 9,698,862) treat the upstream and downstream bands as a single broadband signal with 600 MHz total system bandwidth. This leads to upsampling rates that are close to 12× times the baseband single (~200 MHz) channel sampling rate, ~2.4 Gbps which again has significant hardware complexity.

Accordingly, in various examples, a modified set of kernels can be employed that is a simplification of the original kernels based on the band separation of the interferers by rejecting kernel harmonics that are outside the band of interest. The performance of these modified kernels has been verified by a fixed-point simulator that closely mimics actual product design.

Figure 1A:
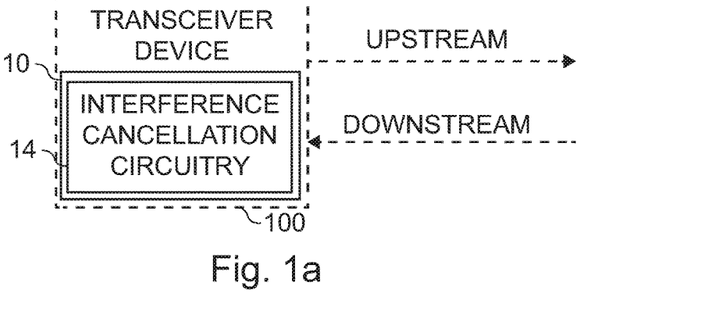
FIGS. 1a and 1b show block diagrams of examples of an apparatus or device for a transceiver device, and of a transceiver device comprising such an apparatus or device.
Figure 1B:
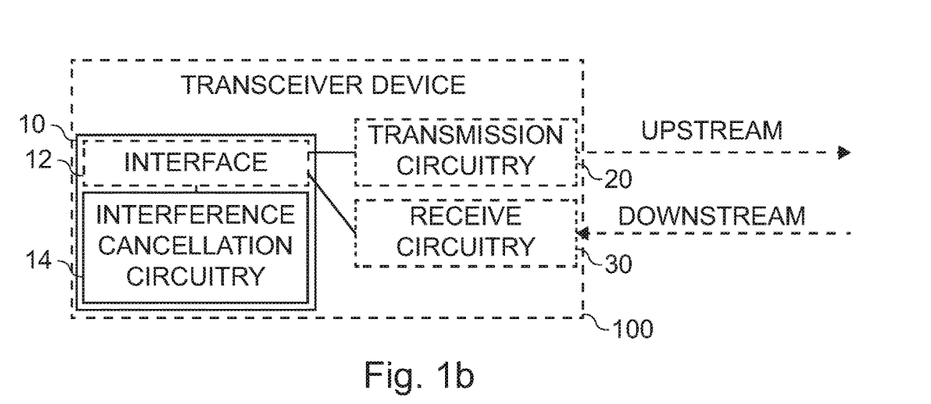

FIGS. 1a and 1b show block diagrams of examples of an apparatus or device 10 for a transceiver device 100. The components of the device 10 are defined as component means, which correspond to the respective structural components of the apparatus 10. The apparatus 10 comprises interference cancellation circuitry 14 (or means for cancelling interference) configured to cancel interference caused by upstream signals in one or more upstream sub-bands on one or more downstream sub-bands based on a combination of a plurality of kernels. The interference is at least partially caused by non-linearities within a transmission circuitry 20 of the transceiver device. The plurality of kernels represent the non-linearities within the transmission circuitry of the transceiver device. Each of the kernels comprises one or more associated terms. Each of the associated terms are in-band for at least one of the one or more downstream sub-bands.

FIGS. 1a and 1b further show the transceiver device 100 comprising the apparatus or device 10. For example, the transceiver device may be a cable modem, e.g. a cable modem for communicating according to the DOCSIS standard. As shown in FIG. 1b, the transceiver device may further comprise transmission circuitry (or means for transmitting) 20 and receive circuitry (or means for receiving) 30. The interference cancellation circuitry may be coupled to the transmission circuitry or receive circuitry via interface circuitry 12. The transceiver device may be configured to receive a downstream signal via the receive circuitry, and to perform interference cancellation on the received downstream signal using the interference cancellation circuitry.

Figure 1C:
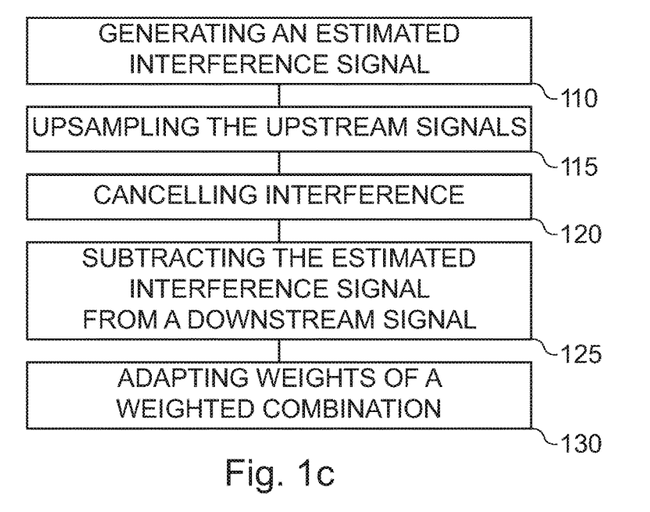
FIG. 1c shows a flow chart of an example of a method for a transceiver device.

FIG. 1c shows a flow chart of an example of a corresponding method for the transceiver device. The method comprises cancelling 120 the interference caused by the upstream signals in the one or more upstream sub-bands on the one or more downstream sub-bands based on the combination of a plurality of kernels. For example, the method may be performed by the transceiver device.

In the following, the concept is shown in connection with the apparatus 10 and the transceiver device 100. The features shown in connection with the apparatus 10 and/or the transceiver device may be likewise applied to the corresponding device 10 or method.

Various examples of the present disclosure relate to an apparatus, a device, and a method for performing interference cancellation in a transceiver device. In this context, the term "interference cancellation" might not be understood in absolute terms—while the goal is to cancel (i.e. remove) a substantive amount of the interference, due to physical limitations, some portions of the interference may remain. Another suitable term for "interference cancellation" may therefore be "interference reduction". Examples of the present disclosure may thus be used to cancel or reduce interference within the transceiver device. The apparatus therefore comprises interference cancellation circuitry 14, which is circuitry that is configured to cancel/reduce the interference. In various examples, the interference being addressed is known as "adjacent channel leakage", which is interference that "leaks" from one band of a spectrum into another. A major reason for such leakage, and thus interference, are the non-linear properties of Power Amplifiers (PAs) being used in the transceiver circuitry of transceiver devices. To achieve a good level of efficiency, PAs are often operated in regions where they exhibit non-linearities, which may generate transient signals that leak into the adjacent frequency bands. In other words, the interference is at least partially caused by non-linearities within the transmission circuitry of the transceiver device.

In the present disclosure, the examples given relate to cable communication systems, e.g. cable communication systems according to the DOCSIS standards. Examples, however, may also be applied to other wireline, or even wireless, communication systems. Accordingly, the transceiver device may be a transceiver device for communicating in a wireline communication network, e.g. a cable communication network (according to the DOCSIS standard). In a spectrum being used for DOCSIS, to increase the bandwidth that is effectively used, upstream sub-bands and downstream sub-bands are often placed in close proximity to each other.

Transmissions of the transmission circuitry (in the upstream sub-bands) may therefore leak into the downstream sub-bands being located in close proximity to the respective upstream sub-bands. In other words, the interference caused by upstream signals in the one or more upstream sub-bands on one or more downstream sub-bands. The transmissions in the one or more upstream sub-bands are generated by the transmission circuitry of the transceiver device.

As these transmissions are generated by the same (transceiver) device that is also being used to receive and decode signals in the one-or-more downstream sub-bands, a knowledge about which signals are transmitted in the upstream sub-bands can be used to estimate the interference caused by the respective signals. To estimate, what interference is caused by the (known) signals, the afore-mentioned kernels are used. The plurality of kernels represent the non-linearities within the transmission circuitry, e.g. within a PA of the transmission circuitry, of the transceiver device. In other words, the plurality of kernels may be a complex mathematical representation that is suitable for estimating the interference caused by the transmission circuitry for given signals transmitted by the transmission circuitry. The plurality of kernels may be a complex function, with the upstream signals being used as input of the function, and with the estimated interference being output by the function. The combination of the plurality of kernels may therefore model the non-linearities within the transmission circuitry. For example, the combination of the plurality of kernels may be a linear combination.

In general, there are different-order kernels. Higher-order kernels are more complex, and require higher upsampling frequencies, but can yield more accurate results. In a scenario without constraints to processing power and processing frequencies, to estimate the interference signal, kernels of high order may be used. In systems with constraints to both processing power and available frequencies, however, examples may use kernels that reduce the processing complexity and upsampling frequencies compared to the above scenario.

In examples, each of the kernels comprises one or more associated terms. Examples of these terms are shown below, where exemplary kernels of different order are presented. In contrast to other implementations of kernels, these kernels are adapted however, to (only) cover the frequency bands of interest. In other words, each of the associated terms being in-band for at least one of the one or more downstream sub-bands. In other words, the one or more kernels may be composed of terms that are in-band for at least one of the one or more downstream sub-bands.

In the following, the basic mathematical concepts behind the concepts are shown. At a later part of the present disclosure, a more detailed method for obtaining the respective kernels is shown. In general, the plurality of kernels may comprise kernels of different order. For example, the highest order may be at least 3 and/or at most 10. For example, the lower-order kernels may be part of the plurality of kernels as well, such that, if the highest order kernel is of order 3, the plurality of kernels comprises kernels of order 1, 2 and 3. For example, the plurality of kernels may comprise at least three kernels. Accordingly, each of the at least three kernels may comprise one or more associated terms, wherein each associated term of each kernel of the at least three kernels is in-band for one of the one or more downstream subbands. For example, the plurality of kernels may comprises at least one kernel or order 3, and/or at least one kernel of order 4, and/or at least one kernel of order 5, and/or at least one kernel of order 6, and/or at least one kernel of order 7, and/or at least one kernel of order 8, and/or at least one kernel, of order 9 etc. For example, the plurality of kernels may comprise at least 3 (or at least 4, at least 5, at least 6) and/or at most 11 (or at most 10, at most 9, at most 8, at most 7) kernels. Each kernel may be based on $$\varphi_k(t) = x(t)|x(t)|^{k-1}$$

where k is the order of the kernel, $\varphi_k(t)$ is the kernel of order k. This is the "basic" formula for the kernel. In order to obtain the kernels being used in the present disclosure, the terms of the above formula may be expanded, and terms that are not in-band of the one or more downstream sub-bands may be removed. In other words, a term (or terms) of the kernels that is/are out-of-band of the one or more downstream sub-bands may be omitted from the respective kernel. In consequence, the kernels of the plurality of kernels may be composed of terms that are in-band for one of the one or more downstream sub-bands. For example, at least one term that is out-of-band for the one or more downstream sub-bands may be omitted from the plurality of kernels.

Figure 3:
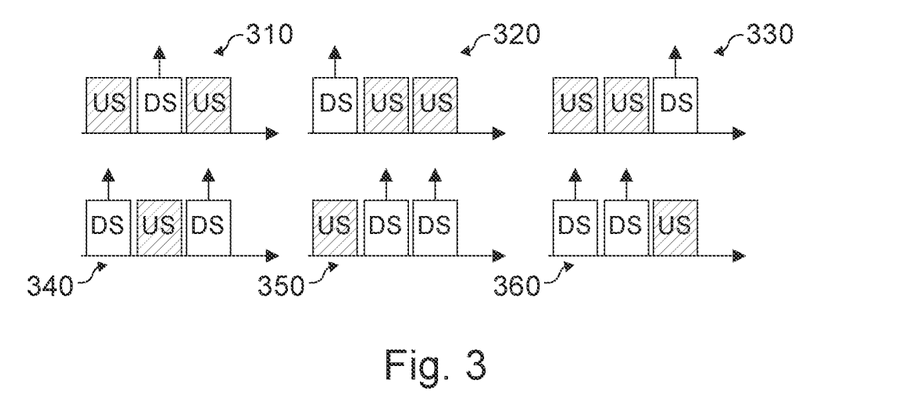
FIG. 3 shows different scenarios for a cable modem upstream and downstream transmission.

In addition, when two or more upstream sub-bands are being considered, there sub-bands may be considered separately. In other words, the interference cancellation circuitry may be configured to cancel the interference caused by signals in two or more upstream sub-bands. Each of the two or more upstream sub-bands may be represented separately within the kernels. Accordingly, the interference may be interference caused by signals from two or more upstream sub-bands on the one or more downstream sub-bands. For example, the terms of the kernels, as presented above, may be expanded, so that the two (or more) upstream sub-bands are represented separately. The two or more upstream sub-bands and the one or more downstream sub-band may be a plurality of adjacent sub-bands of a bandwidth, e.g. of a bandwidth used by the respective (cable) communication system. For example, the two or more upstream sub-bands and the one or more downstream sub-band may form a contiguous spectrum (which may comprise guard bands between the individual sub-bands). There are various scenarios that support such an allocation of the spectrum, as shown in FIG. 3, where scenarios 310 to 320 relate to scenarios with two upstream (US) sub-bands and one downstream (DS) sub-band. For example, as shown in FIG. 3 320 and 330, the two or more upstream sub-bands may be adjacent to one another. Alternatively, as shown in the scenario of FIG. 3 310, at least one of the one or more downstream sub-bands may be (located) between two of the two or more upstream sub-bands.

For example, the interference cancellation circuitry may be configured to cancel the interference caused by signals in a first upstream sub-band $f_1$ and in a second upstream sub-band $f_2$, where $$x(t) = x_1(t)e^{j2\pi f_1 t} + x_2(t)e^{j2\pi f_2 t}$$

where $x_1(t)$ and $x_2(t)$ are the respective sub-terms for the first upstream sub-band $f_1$ and the second upstream sub-band $f_2$. These terms may be combined with the above formula to generate the "basic" higher-order kernels, and terms that fall outside the downstream band or bands are removed.

As has been laid out above, the kernels may be used to generate an estimated interference signal, i.e. a signal that estimates the interference being caused in the one or more downstream sub-bands. In other words, the interference cancellation circuitry may be configured to generate 110 an estimated interference signal caused by the upstream signals using the plurality of kernels. For example, the (known) upstream signals may be used as input to the plurality of kernels, and the combined result of the kernel-based transformation of the input may yield the estimated interference signal. This interference signal may be used to cancel the interference. In other words, the interference cancellation circuitry may be configured to cancel the interference based on the estimated interference signal.

In general, the interference cancellation circuitry may be configured to cancel the interference within a downstream signal (i.e. a signal received within one of the one or more downstream sub-bands, e.g. by the receive circuitry of the transceiver device) received by the transceiver device based on the estimated interference signal. For example, the interference cancellation circuitry may be configured to cancel the interference within the downstream signal by subtracting 122 the estimated interference signal from the downstream signal. In other words, the interference cancellation circuitry may be configured to pre-process the downstream signal before it is decoded. Consequently, the interference cancellation circuitry may be integrated within the receive circuitry. Alternatively, the interference cancellation circuitry may be separate from the receive circuitry, e.g. part of a processing circuitry of the transceiver device that is used for processing the downstream signals (outside the receive circuitry).

To avoid aliasing within the estimated interference signal, the signal may be generated at an upsampling frequency that is significantly higher than the frequency bands of the individual sub-bands. Accordingly, the interference cancellation circuitry is configured to upsample 112 the upstream signals to an upsampling frequency, and to generate the estimated interference signal based on the upsampled upstream signals. For example, the upsampling frequency may be a multiple of a bandwidth of a single sub-band of the one or more upstream sub-bands. For example, in the examples shown in the present disclosure, the bandwidth of the individual sub-bands may be 200 MHz, such that the upsampling frequency is a multiple of 200 MHz, which may be substantially lower than in other systems, where the entire contiguous band (i.e. three times 200 MHz for a scenario with two upstream sub-bands and one down-stream sub-bands) is used as input for the respective kernels. The upsampling frequency may be chosen based on the order of the kernels, as higher-order kernels benefit from the increased precision. For example, the upsampling frequency the upsampling frequency may be at least the bandwidth of the single sub-band of the one or more upstream sub-bands (e.g. 200 MHz) multiplied by the order of the kernel with the highest order (e.g. 9, if the highest-order kernel is of order 9). For example, the interference cancelation circuitry may be configured to upsample the linear combination of at least three kernels by at or around four times a baseband sampling rate of a single sub-band of the two or more upstream sub-bands.

In some examples, the kernels may receive equal weight. In some examples, however, different kernels may be weighted differently. In other words, the interference cancellation circuitry may be configured to cancel the interference based on a weighted combination of the plurality of kernels. For example, at least one kernel of the plurality of kernels may receive a higher weight than at least one other kernel of the plurality of kernels. For example, the weighted combination of the plurality of kernels may be pre-defined. Alternatively, the weights may be set and/or adapted by the interference cancellation circuitry. In other words, the interference cancellation circuitry may be configured to adapt 130 the weights of the weighted combination. For example, the (linear) combination of the plurality of kernels may employ an associated weight for each kernel of the plurality of kernels that is determined via an adaptive algorithm. For example, the interference cancellation circuitry may be configured to compare a signal-to-interference and noise ratio (SINR) for different combinations of weights, and adapt the weights to the combination that yields an improved SINR. For example, a loss function may be used to adapt the weights. The interference cancellation circuitry may be configured to perform the adaptation of the weights in pre-defined intervals, e.g. every minute, every fifteen minutes, or every hour. For example, the adaptation of the weights may be performed using the processing circuitry.

The interface circuitry 12 may correspond to one or more inputs and/or outputs for receiving and/or transmitting information, which may be in digital (bit) values according to a specified code, within a module, between modules or between modules of different entities. For example, the interface circuitry 12 may comprise interface circuitry configured to receive and/or transmit information.

In various examples, the interference cancelation circuitry or means for cancelling interference 14 and/or the processing circuitry or means for processing may be implemented using one or more processing units, one or more processing devices, any means for processing, such as a processor, a computer or a programmable hardware component being operable with accordingly adapted software. In other words, the described function of the interference cancelation circuitry or means for cancelling interference 14 and/or the processing circuitry or means for processing may as well be implemented in software, which is then executed on one or more programmable hardware components. Such hardware components may comprise a general-purpose processor, a Digital Signal Processor (DSP), a micro-controller, etc. For example, the interference cancelation circuitry or means for cancelling interference 14 and/or the processing circuitry or means for processing may be coupled to the interface, to the transmission circuitry or means for transmitting 20 and/or to the receive circuitry or means for receiving 30.

The transmission circuitry or means for transmitting 20 may be implemented as any means for transmitting, one or more transmitter units, one or more transmitter devices, and it may comprise typical transmitter components, such as one or more elements of the group of one or more Low-Noise Amplifiers (LNAs), one or more Power Amplifiers (PAs), one or more filters or filter circuitry, one or more diplexers, one or more duplexers, one or more Analog-to-Digital converters (A/D), one or more Digital-to-Analog converters (D/A), one or more modulators or demodulators, one or more mixers, one or more antennas, etc.

The receive circuitry or means for receiving 30 may be implemented as any means for receiving, one or more receiver units, one or more receiver devices, and it may comprise typical receiver components, such as one or more elements of the group of one or more Low-Noise Amplifiers (LNAs), one or more Power Amplifiers (PAs), one or more filters or filter circuitry, one or more diplexers, one or more duplexers, one or more Analog-to-Digital converters (A/D), one or more Digital-to-Analog converters (D/A), one or more modulators or demodulators, one or more mixers, one or more antennas, etc.

More details and aspects of the apparatus, device or method for the transceiver device, and/or of the transceiver device are mentioned in connection with the proposed concept or one or more examples described above or below (e.g. FIGS. 2 to 5). The apparatus, device, or method for the transceiver device, and/or of the transceiver device may comprise one or more additional optional features corresponding to one or more aspects of the proposed concept or one or more examples described above or below.

Techniques and examples discussed herein employ a kernel design with much lower complexity in terms of sampling rate. In contrast to existing systems, examples discussed herein can employ only 4× times the single channel (200 MHz) baseband sampling rate (e.g., ~800 Mbps) for upsampling, which is a 300% reduction over existing techniques. Further, the FFT (Fast Fourier Transform) techniques employed in various examples can minimize the need in existing systems for designing sharp filters with large attenuation in the Rx. Various examples can provide up to 40 dB cancelation.

Due to serious competition from Fiber and Wireless industries, the Cable modem industry acted aggressively in adopting full duplex technology. CableLabs completed development of the standard for full-duplex DOCSIS (Data Over Cable Service Interface Specification).

Uplink streams (US): (1) Saturates Rx chain: thus, in-band self-interference cancelation should be employed; and (2) Creates out-of-band interference which avoids decoding of Downlink stream (DS): out-of-band self-interference cancelation.

This leads to the following challenges: (1) Ability to handle longer delay spreads than wireless (500 nsec~1 usec); (2) Wider bandwidth (~600 MHz) than LTE (Long Term Evolution) & Wi-Fi; (3) Intermodulation of multiple US: not addressed by existing kernels; (4) Desire to receive 4k-QAM (Quadrature Amplitude Modulation), which can be facilitated via deeper cancelation; (5) relevant HW architecture for efficient implementation.

Figure 2:
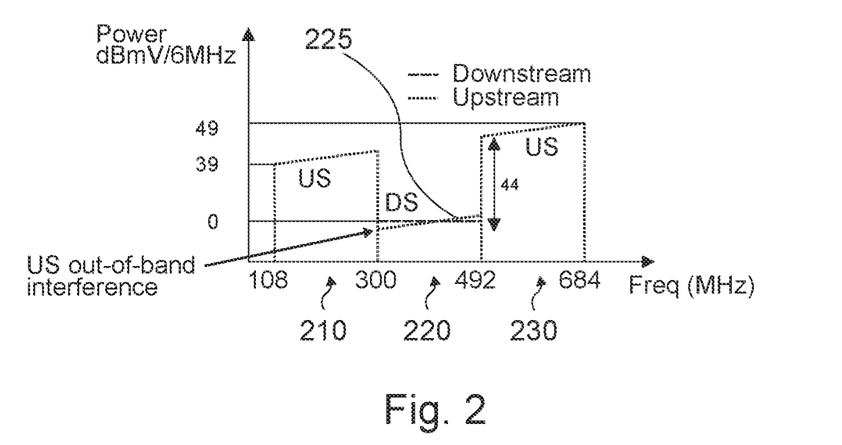
FIG. 2 shows effects of upstream out-of-band interference in an example scenario.

Referring to FIG. 2 illustrated is a diagram showing the effect of US out-of-band interference for one example transmission scenario, in connection with various aspects discussed herein. FIG. 2 shows, on the x-axis, the frequency (in MHz), and on the y-axis the Power (in dBmV/6 MHz). FIG. 2 shows two upstream bands 210; 230 that are located on both sides of downstream band 220. Within downstream band, upstream out-of-band-interference 225 can be seen. Accordingly, FIG. 2 shows effects of US out-of-band interference in an example scenario.

Referring to FIG. 3 illustrated are different scenarios for the cable modem upstream and downstream transmission, in connection with various aspects discussed herein. With three sub-bands, a total of six scenarios are feasible. In scenarios 1 to 3, two downstream bands and one upstream band are used. In the first scenario 310, two upstream bands are located on either side of a downstream band. In the second 320 and third scenario 330, two upstream bands are located adjacent to another, with one of the upstream bands being adjacent to a downstream band. In the second scenario, the downstream band is located at lower frequencies than the upstream bands, in the third scenario, the downstream band is located at higher frequencies than the upstream bands. In scenarios 4 to 6, two downstream bands and one upstream band are used. In the fourth scenario 340, two downstream bands are located on either side of an upstream band. In the fifth 350 and sixth scenario 360, two downstream bands are located adjacent to another, with one of the downstream bands being adjacent to an upstream band.

In the fifth scenario, the upstream band is located at lower frequencies than the downstream bands, in the third scenario, the upstream band is located at higher frequencies than the downstream bands.

In various examples, kernels discussed herein can be employed for interference cancelation for communication scenarios such as illustrated in FIGS. 2 and 3.

In various examples, architecture and kernels discussed herein can be employed for interference cancelation, which can provide for improved performance over existing systems and techniques. In various examples, the cancelation engine can have as input the Tx baseband signal and can have as outputs the estimated out-of-band echo in a victim band. The signal path (e.g., the Tx chain and/or the Rx chain) can be modeled in the SIC (Signal Interference Cancellation) engine. The PA can be modeled through a linear combination of kernels whose weights can be adapted through an adaptive algorithm, wherein the design of these kernels can be as discussed in various aspects herein.

The Rx echo is created after non-linear distortion (e.g., after the PA). The PA output which goes to the echo channel is modeled by a linear combination of kernels $\phi_k(t)$, as in equation (1):

$$s(t) = \sum_{k=1}^{K} a_k \varphi_k(t) \quad (1)$$

The kernels used can be of the form shown in equation (2):

$$\varphi_k(t) = x(t)|x(t)|^{k-1} \quad (2)$$

where, per equation (3), $$x(t) = x_1(t)e^{j2\pi f_1 t} + x_2(t)e^{j2\pi f_2 t} \quad (3)$$

when two sub-bands are US. Note that in the scenario where the DS band is in between the US bands (i.e., $f_1 = -f_2$), the effective bandwidth of the signal x(t) is ~600 MHz. When two US subbands are contiguous (i.e., $2f_1 = f_2$), the effective bandwidth is ~400 MHz. For effective cancelation, highly accurate generation of the kernels OM and estimation of the coefficients should be employed. A kernel of order K has an effective bandwidth of K times the original signal bandwidth, which is ~600 MHz here. In simulations with different PA models, the minimum desired cancelation is provided by kernels of order 4 to 7. For this, the signal is upsampled at least 4× times to prevent aliasing, such that the system will be operating at an effective rate of 2.4 GHz, which is impractical.

However, in contrast to existing systems, in various examples, kernels can be generated that are functions of the individual baseband signals $x_1(t)$ and $x_2(t)$, that each have a smaller bandwidth of ~200 MHz, leading to an effective bandwidth ~4× times the baseband bandwidth (which is ~200 MHz), leading to much lower complexity than existing techniques and systems.

Accordingly, in various examples, each of the individual kernel terms can be expanded, and terms that fall outside of the desired frequency band (which is the DS band in this case) can be omitted.

For x(t) as in equation (3), Kernel 1 can be x(t) and Kernel 2 can be x(t)|x(t)|. These kernels can be retained as the original kernel and can be downsampled at the lower rate. This does not lead to significant performance degradation due to the fact that in the out-of-band cancelation case, the higher order kernels have a larger contribution.

With equation (4), $$|x(t)|^2 = |x_1(t)|^2 + |x_2(t)|^2 + x_1(t)x^*_2(t)e^{j2\pi(f_1-f_2)t} + x_2(t)x^*_1(t)e^{-j2\pi(f_1-f_2)t} \quad (4)$$

each of the terms can be generated separately, which is at the lower sampling rate.

Kernel 3 can be as in equation (5):

$$x(t)|x(t)|^2 = \quad (5)$$

$$x_1(t)|x_1(t)|^2 e^{j2\pi f_1 t} + x_1(t)|x_2(t)|^2 e^{j2\pi f_1 t} + x_1^2(t)x_2^*(t)e^{j2\pi(2f_1-f_2)t} +$$

$$x_2(t)|x_1(t)|^2 e^{j2\pi f_2 t} + x_2(t)|x_1(t)|^2 e^{j2\pi f_2 t} + x_2(t)|x_2(t)|^2 e^{j2\pi f_2 t} +$$

$$x_1(t)|x_2(t)|^2 e^{j2\pi f_1 t} + x_2^2(t)x_1^*(t)e^{-j2\pi(f_1-2f_2)t} =$$

$$x_1(t)|x_1(t)|^2 e^{j2\pi f_1 t} + x_2(t)|x_2(t)|^2 e^{j2\pi f_2 t} + 2x_1(t)|x_2(t)|^2 e^{j2\pi f_1 t} +$$

$$2x_2(t)|x_1(t)|^2 e^{j2\pi f_2 t} + x_1^2(t)x_2^*(t)e^{j2\pi(2f_1-f_2)t} + x_2^2(t)x_1^*(t)e^{-j2\pi(f_1-2f_2)t}$$

which, for the two different scenarios ($f_1 = -f_2$ and $2f_1 = f_2$), leads to equations (6) and (7), respectively:

$$f_1 = -f_2 x(t)|x(t)|^2 = x_1(t)|x_1(t)|^2 e^{-j2\pi f_2 t} + \quad (6)$$

$$x_2(t)|x_2(t)|^2 e^{j2\pi f_2 t} + 2x_1(t)|x_2(t)|^2 e^{-j2\pi f_2 t} + 2x_2(t)|x_1(t)|^2 e^{j2\pi f_2 t}$$

$$2f_1 = f_2 x(t)|x(t)|^2 = x_1(t)|x_1(t)|^2 e^{j2\pi f_1 t} + 2x_1(t)|x_2(t)|^2 e^{j2\pi f_1 t} + \quad (7)$$

$$2x_2(t)|x_1(t)|^2 e^{j2\pi 2f_1 t} + x_1^2(t)x_2^*(t) +$$

wherein the terms that fall outside of the victim band are removed (marked as struck-through). These terms do not interfere with the reception of DS but increase the sampling frequency.

The two scenarios of equations (6) and (7) represent the US-DS-US case (equation (6)) and the DS-US-US/US-US-DS case (equation (7)), respectively. As discussed above, the individual terms can be generated at a lower sampling rate and summed together.

Proceeding in a similar way, the different higher order kernels can be defined as a combination of different kernels that are generated at a lower sampling rate, as shown in Table 1, which summarized the kernels up to order 11:

In the following, the kernels are shown up to order 11 for US-DS-US and US-US-DS-Scenarios. First for US-DS-US, $f_1 = -f_2$:

| | |
|---|---|
| $x(t)$ | (Order 1) |
| $x(t)|x(t)|$ | (Order 2) |
| $x(t)|x(t)|^2 - x_1^2(t)x_2^*(t)e^{j2\pi 3f_1 t} -$ | (Order 3) |

-continued $$x_1^*(t)x_2^2(t)e^{-j2\pi 3f_1 t}x(t)|x(t)|^4 - 2x_1^2(t)|x_1(t)|^2 x_2^{*2}(t)e^{j2\pi 3f_1 t} -$$

$$3x_1^*(t)|x_1(t)|^2 x_2^2(t)e^{-j2\pi 3f_1 t} - 3x_1^2(t)x_2^*(t)|x_2(t)|^2 e^{j2\pi 3f_1 t} -$$

$$2x_1^*(t)x_2^2(t)|x_2(t)|^2 e^{-j2\pi 3f_1 t} - x_1^3(t)x_2^{*2}(t)e^{j2\pi 5f_1 t}$$

$$-x_1^{*2}(t)x_2^3(t)e^{-2\pi 5f_1 t}x(t)|x(t)|^6 - 3x_1^3(t)|x_1(t)|^2 x_2^{*2}(t)e^{j2\pi(5f_1)t} -$$ (Order 5)

$$4x_1^{*2}(t)|x_1(t)|^2 x_2^3(t)e^{-j2\pi(5f_1)t} - 4x_1^3(t)x_2^{*2}(t)|x_2(t)|^2 e^{j2\pi(5f_1)t} -$$

$$3x_1^{*2}(t)x_2^3(t)|x_2(t)|^2 e^{-2\pi(5f_1)t} - x_1^4(t)x_2^{*3}(t)e^{j2\pi(7f_1)t}$$

$$-x_1^{*3}(t)x_2^4(t)e^{-j2\pi(7f_1)t}x(t)|x(t)|^8 - 6x_1^3(t)|x_1(t)|^4 x_2^{*2}(t)e^{j2\pi(5f_1)t} -$$ (Order 7)

$$10x_1^{*2}|x_1(t)|^4 x_2^3(t)e^{-j2\pi(5f_1)t} - 20x_1^3(t)|x_1(t)|^2 x_2^{*2}|x_2(t)|^2 e^{j2\pi(5f_1)t} -$$

$$20x_1^{*2}(t)|x_1(t)|^2 x_2^3(t)|x_2(t)|^2 e^{-j2\pi(5f_1)t} -$$

$$4x_1^4(t)|x_1(t)|^2 x_2^{*3}(t)e^{j2\pi(7f_1)t} - 5x_1^{*3}(t)|x_1(t)|^2 x_2^4(t)e^{-j2\pi(7f_1)t} -$$

$$10x_1^3(t)x_2^{*2}(t)|x_2(t)|^4 e^{j2\pi(5f_1)t} - 6x_1^{*2}(t)x_2^3(t)|x_2(t)|^4 e^{-j2\pi(5f_1)t} -$$

$$5x_1^4(t)x_2^{*3}(t)|x_2(t)|^2 e^{j2\pi(7f_1)t} - 4x_1^{*3}(t)x_2^4(t)|x_2(t)|^2 e^{-j2\pi(7f_1)t}$$

$$-x_1^5(t)x_2^{*4}(t)e^{j2\pi(9f_1)t} - x_1^{*4}(t)x_2^5(t)e^{-j2\pi(9f_1)t}x(t)|x(t)|^{10} -$$ (Order 9)

$$10x_1^4(t)|x_1(t)|^4 x_2^{*3}(t)e^{j2\pi(7f_1)t} - 15x_1^{*3}(t)|x_1(t)|^4 x_2^4(t)e^{-j2\pi(7f_1)t} -$$

$$30x_1^4(t)|x_1(t)|^2 x_2^{*3}|x_2(t)|^2 e^{j2\pi(7f_1)t} -$$

$$30x_1^{*3}(t)|x_1(t)|^2 x_2^4(t)|x_2(t)|^2 e^{-j2\pi(7f_1)t} -$$

$$5x_1^5(t)|x_1(t)|^2 x_2^{*4}(t)e^{j2\pi(9f_1)t} - 6x_1^{*4}(t)|x_1(t)|^2 x_2^5(t)e^{-j2\pi(9f_1)t} -$$

$$15x_1^4(t)x_2^{*3}(t)|x_2(t)|^4 e^{j2\pi(7f_1)t} - 10x_1^{*3}(t)x_2^4(t)|x_2(t)|^4 e^{-j2\pi(7f_1)t} -$$

$$6x_1^5(t)x_2^{*4}(t)|x_2(t)|^2 e^{j2\pi(9f_1)t} - 5x_1^{*4}(t)x_2^5(t)|x_2(t)|^2 e^{-j2\pi(9f_1)t}$$

$$-x_1^6(t)x_2^{*5}(t)e^{j2\pi(11f_1)t} - x_1^{*5}(t)x_2^6(t)e^{-j2\pi(11f_1)t}$$ (Order 11)

For US-US-DS, $2f_1=f_2$:

$$x(t)$$ (Order 1)

$$x(t)|x(t)|x(t)|x(t)|^2 - x_2(t)|x_2(t)|^2 e^{j2\pi 2f_1 t} - 2|x_1(t)|^2 x_2(t)e^{j2\pi 2f_1 t}$$ (Order 2)

$$-x_1^2(t)x_2^*(t)e^{j2\pi 3f_1 t}x(t)|x(t)|^4 -$$ (Order 3)

$$3x_1^*(t)|x_1(t)|^2 x_2^2(t)e^{j2\pi 3f_1 t} - 2x_1^*(t)x_2^2(t)|x_2(t)|^2 e^{j2\pi 3f_1 t}$$

$$-x_1^{*2}(t)x_2^3(t)e^{j2\pi 4f_1 t}x(t)|x(t)|^6 - 4x_1^{*2}|x_1(t)|^2 x_2^3(t)e^{j2\pi(4f_1)t}$$ (Order 5)

$$-3x_1^{*2}(t)x_2^3(t)|x_2(t)|^2 e^{j2\pi(4f_1)t} -$$ (Order 7)

$$x_1^{*3}(t)x_2^4(t)e^{j2\pi(5f_1)t}x(t)|x(t)|^8 - 5x_1^{*3}(t)|x_1(t)|^2 x_2^4(t)e^{j2\pi(5f_1)t}$$

$$-4x_1^{*3}(t)x_2^4(t)|x_2(t)|^2 e^{j2\pi(5f_1)t} - x_1^{*4}(t)x_2^5(t)e^{j2\pi(6f_1)t}x(t)|x(t)|^{10} -$$ (Order 9)

$$6x_1^{*4}(t)|x_1(t)|^2 x_2^5(t)e^{j2\pi(6f_1)t} - 5x_1^{*4}(5)x_2^5(t)|x_2(t)|^2 x_2^5(t)e^{j2\pi(6f_1)t}$$

$$-x_1^{*5}(t)x_2^6(t)e^{j2\pi(7f_1)t}$$ (Order 11)

Figure 4:
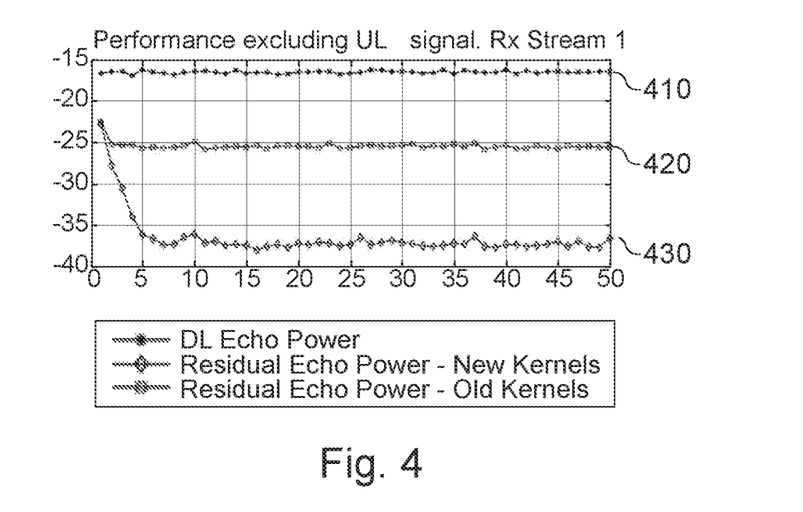
FIG. 4 shows a diagram showing simulated cancelation performance of kernels employed in various examples.

The cancelation performance of kernels employed in various examples were measured via simulation. Referring to FIG. 4, illustrated is a diagram showing simulated cancelation performance of kernels employed in various examples discussed herein ("New Kernels") compared with existing kernels ("Old Kernels"). Graph 410 shows the downlink echo power, graph 420 shows the residual echo power obtained by kernels generated according to other concepts, and graph 430 shows the residual echo power obtained by the kernels introduced in the present disclosure. FIG. 4 may show the cancelation performance of kernels discussed herein compared with existing kernels. In FIG. 4, the cancelation performance of kernels described herein was simulated for the case when the oversampling frequency of the IC engine is 4× of 200 MHz instead of 600 MHz. As can be seen in FIG. 4, with a system employing kernels as discussed herein, significantly higher echo cancelation can be achieved.

Figure 5:
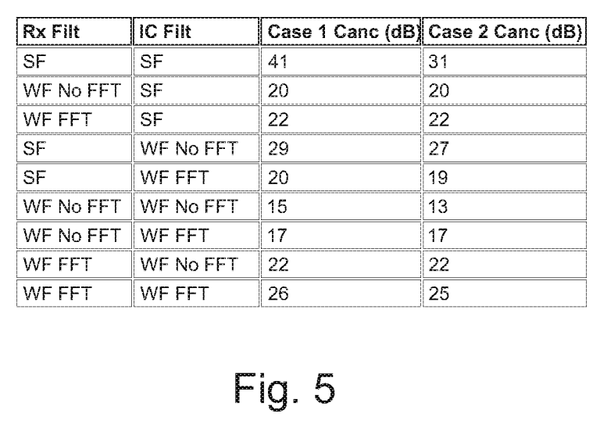
FIG. 5 shows a table indicating the cancelation performance under different filter designs.

FIG. 5, also indicates the cancelation performance under different filter designs for the interpolations and decimation filters, wherein SF refers to a Sharp Filter with a narrow transition bandwidth (BW) and WF refers to a Wide Filter with a wide transition BW. FFT refers to the use of a Fast Fourier Transform, while NoFFT indicates, that no FFT was used. FIG. 5 shows a table of the cancelation performance of kernels discussed herein for various filter designs.

As can be seen in the table of FIG. 5, varying degrees of interference cancelation can be obtained depending on the level of complexity of the filters. For example, around 20 dB of cancelation can be obtained without a significant level of complexity for the filter designs. Alternatively, up to 41 dB of cancelation can be obtained if larger complexity in the number of filter taps is permitted. Even in this latter scenario, the complexity is still significantly lower than scenarios employing existing techniques, which necessitate the design of sharp filters to suppress the out of band leakage.

Various examples can perform interference cancelation based on kernel designs discussed herein, which can significantly enhance cable modem performance compared with existing systems.

Examples herein can include subject matter such as a method, means for performing acts or blocks of the method, at least one machine-readable medium including executable instructions that, when performed by a machine (e.g., a processor with memory, an application-specific integrated circuit (ASIC), a field programmable gate array (FPGA), or the like) cause the machine to perform acts of the method or of an apparatus or system for concurrent communication using multiple communication technologies according to examples and examples described.

The aspects and features mentioned and described together with one or more of the previously detailed examples and figures, may as well be combined with one or more of the other examples in order to replace a like feature of the other example or in order to additionally introduce the feature to the other example.

Example 1 relates to an apparatus (10) for a transceiver device (100), comprising interference cancellation circuitry (14) configured to cancel interference caused by upstream signals in one or more upstream sub-bands on one or more downstream sub-bands based on a combination of a plurality of kernels, wherein the interference is at least partially caused by non-linearities within a transmission circuitry of the transceiver device, the plurality of kernels representing the non-linearities within the transmission circuitry of the transceiver device, wherein each of the kernels comprises one or more associated terms, with each of the associated terms being in-band for at least one of the one or more downstream sub-bands.

In Example 2, the subject matter of example 1 or any of the Examples described herein may further include, that the interference cancellation circuitry is configured to cancel the interference caused by signals in two or more upstream sub-bands, wherein each of the two or more upstream sub-bands is represented separately within the kernels.

In Example 3, the subject matter of one of the examples 1 to 2 or any of the Examples described herein may further include, that the interference cancellation circuitry is configured to generate an estimated interference signal caused by the upstream signals using the plurality of kernels, and to cancel the interference based on the estimated interference signal.

In Example 4, the subject matter of example 3 or any of the Examples described herein may further include, that the interference cancellation circuitry is configured to cancel the interference within a downstream signal received by the transceiver device based on the estimated interference signal.

In Example 5, the subject matter of example 4 or any of the Examples described herein may further include, that the interference cancellation circuitry is configured to cancel the interference within the downstream signal by subtracting the estimated interference signal from the downstream signal.

In Example 6, the subject matter of one of the examples 3 to 5 or any of the Examples described herein may further include, that the interference cancellation circuitry is configured to upsample the upstream signals to an upsampling frequency, and to generate the estimated interference signal based on the upsampled upstream signals.

In Example 7, the subject matter of example 6 or any of the Examples described herein may further include, that the upsampling frequency is a multiple of a bandwidth of a single sub-band of the one or more upstream sub-bands.

In Example 8, the subject matter of example 7 or any of the Examples described herein may further include, that the plurality of kernels comprise kernels of different order, wherein the upsampling frequency is at least the bandwidth of the single sub-band of the one or more upstream sub-bands multiplied by the order of the kernel with the highest order.

In Example 9, the subject-matter of one of the examples 1 to 8 or any of the Examples described herein may further include, that the plurality of kernels comprise kernels of different order, wherein each kernel is based on $$\varphi_k(t) = x(t)|x(t)|^{k-1}$$

where k is the order of the kernel, $\varphi_k(t)$ is the kernel of order k, and wherein a term of the kernels that is out-of-band of the one or more downstream sub-bands is omitted from the respective kernel.

In Example 10, the subject-matter of one of the examples 1 to 9 or any of the Examples described herein may further include, that the interference cancellation circuitry is configured to cancel the interference caused by signals in a first upstream sub-band $f_1$ and in a second upstream sub-band $f_2$, wherein $$x(t) = x_1(t)e^{j2\pi f_1 t} + x_2(t)e^{j2\pi f_2 t}$$

where $x_1(t)$ and $x_2(t)$ are the respective sub-terms for the first upstream sub-band $f_1$ and the second upstream sub-band $f_2$.

In Example 11, the subject matter of one of the examples 1 to 10 or any of the Examples described herein may further include, that the plurality of kernels comprise kernels of different order, wherein the highest order is at least 3 and/or at most 10.

In Example 12, the subject matter of one of the examples 1 to 11 or any of the Examples described herein may further include, that the interference cancellation circuitry is configured to cancel the interference based on a weighted combination of the plurality of kernels.

In Example 13, the subject matter of example 12 or any of the Examples described herein may further include, that the interference cancellation circuitry is configured to adapt the weights of the weighted combination.

In Example 14, the subject matter of one of the examples 1 to 13 or any of the Examples described herein may further include, that the interference cancellation circuitry is configured to cancel the interference caused by signals in two or more upstream sub-bands. wherein the two or more upstream sub-bands and the one or more downstream sub-band are a plurality of adjacent sub-bands of a bandwidth.

In Example 15, the subject matter of example 14 or any of the Examples described herein may further include, that the two or more upstream sub-bands are adjacent to one another.

In Example 16, the subject matter of example 14 or any of the Examples described herein may further include, that at least one of the one or more downstream sub-bands is between two of the two or more upstream sub-bands.

Example 17 relates to a transceiver device (100) comprising the apparatus (10) according to one of the examples 1 to 16, transmission circuitry (20) and receive circuitry (30), wherein the transceiver device is configured to receive a downstream signal via the receive circuitry, and to perform interference cancellation on the received downstream signal using the interference cancellation circuitry.

Example 18 relates to a cable modem (100) comprising the apparatus (10) according to one of the examples 1 to 16, wherein the cable modem is the transceiver device.

Example 19 relates to a device (10) for a transceiver device (100), comprising means for cancelling interference (14) configured to cancel interference caused by upstream signals in one or more upstream sub-bands on one or more downstream sub-bands based on a combination of a plurality of kernels, wherein the interference is at least partially caused by non-linearities within a transmission circuitry of the transceiver device, the plurality of kernels representing the non-linearities within the transmission circuitry of the transceiver device, wherein each of the kernels comprises one or more associated terms, with each of the associated terms being in-band for at least one of the one or more downstream sub-bands.

In Example 20, the subject matter of example 19 or any of the Examples described herein may further include, that the means for cancelling interference is configured to cancel the interference caused by signals in two or more upstream sub-bands, wherein each of the two or more upstream sub-bands is represented separately within the kernels.

In Example 21, the subject matter of one of the examples 19 to 20 or any of the Examples described herein may further include, that the means for cancelling interference is configured to generate an estimated interference signal caused by the upstream signals using the plurality of kernels, and to cancel the interference based on the estimated interference signal.

In Example 22, the subject matter of example 21 or any of the Examples described herein may further include, that the means for cancelling interference is configured to cancel the interference within a downstream signal received by the transceiver device based on the estimated interference signal In Example 23, the subject matter of example 22 or any of the Examples described herein may further include, that the means for cancelling interference is configured to cancel the interference within the downstream signal by subtracting the estimated interference signal from the downstream signal.

In Example 24, the subject matter of one of the examples 21 to 23 or any of the Examples described herein may further include, that the means for cancelling interference is configured to upsample the upstream signals to an upsampling frequency, and to generate the estimated interference signal based on the upsampled upstream signals.

In Example 25, the subject matter of example 24 or any of the Examples described herein may further include, that the upsampling frequency is a multiple of a bandwidth of a single sub-band of the one or more upstream sub-bands.

In Example 26, the subject matter of example 25 or any of the Examples described herein may further include, that the plurality of kernels comprise kernels of different order, wherein the upsampling frequency is at least the bandwidth of the single sub-band of the one or more upstream sub-bands multiplied by the order of the kernel with the highest order.

In Example 27, the subject matter of one of the examples 19 to 26 or any of the Examples described herein may further include, that the plurality of kernels comprise kernels of different order, wherein each kernel is based on $$\varphi_k(t)=x(t)|x(t)|^{k-1}$$

where k is the order of the kernel, $\varphi_k(t)$ is the kernel of order k, and wherein a term of the kernels that is out-of-band of the one or more downstream sub-bands is omitted from the respective kernel.

In Example 28, the subject matter of one of the examples 19 to 27 or any of the Examples described herein may further include, that the means for cancelling interference is configured to cancel the interference caused by signals in a first upstream sub-band $f_1$ and in a second upstream sub-band $f_2$, wherein $$x(t)=x_1(t)e^{j2\pi f_1 t}+x_2(t)e^{j2\pi f_2 t}$$

where $x_1(t)$ and $x_2(t)$ are the respective sub-terms for the first upstream sub-band $f_1$ and the second upstream sub-band $f_2$.

In Example 29, the subject matter of one of the examples 19 to 28 or any of the Examples described herein may further include, that the plurality of kernels comprise kernels of different order, wherein the highest order is at least 3 and/or at most 10.

In Example 30, the subject matter of one of the examples 19 to 29 or any of the Examples described herein may further include, that the means for cancelling interference is configured to cancel the interference based on a weighted combination of the plurality of kernels.

In Example 31, the subject matter of example 30 or any of the Examples described herein may further include, that the means for cancelling interference is configured to adapt the weights of the weighted combination.

In Example 32, the subject matter of one of the examples 19 to 31 or any of the Examples described herein may further include, that the means for cancelling interference is configured to cancel the interference caused by signals in two or more upstream sub-bands. wherein the two or more upstream sub-bands and the one or more downstream sub-band are a plurality of adjacent sub-bands of a bandwidth.

In Example 33, the subject matter of example 32 or any of the Examples described herein may further include, that the two or more upstream sub-bands are adjacent to one another.

In Example 34, the subject matter of example 32 or any of the Examples described herein may further include, that at least one of the one or more downstream sub-bands is between two of the two or more upstream sub-bands.

Example 35 relates to a transceiver device (100) comprising the device (10) according to one of the examples 19 to 34, means for transmitting (20) and means for receiving (30), wherein the transceiver device is configured to receive a downstream signal via the receive circuitry, and to perform interference cancellation on the received downstream signal using the means for cancelling interference.

Example 36 relates to a cable modem (100a) comprising the device (10) according to one of the examples 19 to 34, wherein the cable modem is the transceiver device.

Example 37 relates to a method for a transceiver device (100), comprising cancelling (120) interference caused by upstream signals in one or more upstream sub-bands on one or more downstream sub-bands based on a combination of a plurality of kernels, wherein the interference is at least partially caused by non-linearities within a transmission circuitry of the transceiver device, the plurality of kernels representing the non-linearities within the transmission circuitry of the transceiver device, wherein each of the kernels comprises one or more associated terms, with each of the associated terms being in-band for at least one of the one or more downstream sub-bands.

In Example 38, the subject matter of example 37 or any of the Examples described herein may further include, that the method comprises cancelling (120) the interference caused by signals in two or more upstream sub-bands, wherein each of the two or more upstream sub-bands is represented separately within the kernels.

In Example 39, the subject matter of one of the examples 37 to 38 or any of the Examples described herein may further include, that the method comprises generating (110) an estimated interference signal caused by the upstream signals using the plurality of kernels, and canceling (120) the interference based on the estimated interference signal.

In Example 40, the subject matter of example 39 or any of the Examples described herein may further include, that the method comprises cancelling (120) the interference within a downstream signal received by the transceiver device based on the estimated interference signal In Example 41, the subject matter of example 40 or any of the Examples described herein may further include, that the method comprises cancelling (120) the interference within the downstream signal by subtracting (122) the estimated interference signal from the downstream signal.

In Example 42, the subject matter of one of the examples 39 to 41 or any of the Examples described herein may further include, that the method comprises upsampling (115) the upstream signals to an upsampling frequency, and generating (110) the estimated interference signal based on the upsampled upstream signals.

In Example 43, the subject matter of example 42 or any of the Examples described herein may further include, that the upsampling frequency is a multiple of a bandwidth of a single sub-band of the one or more upstream sub-bands.

In Example 44, the subject matter of example 43 or any of the Examples described herein may further include, that the plurality of kernels comprise kernels of different order, wherein the upsampling frequency is at least the bandwidth of the single sub-band of the one or more upstream sub-bands multiplied by the order of the kernel with the highest order.

In Example 45, the subject matter of one of the examples 37 to 44 or any of the Examples described herein may further include, that the plurality of kernels comprise kernels of different order, wherein each kernel is based on $$\varphi_k(t)=x(t)|x(t)|^{k-1}$$

where k is the order of the kernel, $\varphi_k(t)$ is the kernel of order k, and wherein a term of the kernels that is out-of-band of the one or more downstream sub-bands is omitted from the respective kernel.

In Example 46, the subject matter of one of the examples 37 to 45 or any of the Examples described herein may further include, that the method comprises cancelling (120)

the interference caused by signals in a first upstream sub-band $f_1$ and in a second upstream sub-band $f_2$, wherein $$x(t)=x_1(t)e^{j2\pi f_1 t}+x_2(t)e^{j2\pi f_2 t}$$

where $x_1(t)$ and $x_2(t)$ are the respective sub-terms for the first upstream sub-band $f_1$ and the second upstream sub-band $f_2$.

In Example 47, the subject matter of one of the examples 37 to 46 or any of the Examples described herein may further include, that the plurality of kernels comprise kernels of different order, wherein the highest order is at least 3 and/or at most 10.

In Example 48, the subject matter of one of the examples 37 to 47 or any of the Examples described herein may further include, that the method comprises cancelling (120) the interference based on a weighted combination of the plurality of kernels.

In Example 49, the subject matter of example 48 or any of the Examples described herein may further include, that the method comprises adapting (130) the weights of the weighted combination.

In Example 50, the subject matter of one of the examples 37 to 49 or any of the Examples described herein may further include, that the method comprises cancelling (120) the interference caused by signals in two or more upstream sub-bands. wherein the two or more upstream sub-bands and the one or more downstream sub-band are a plurality of adjacent sub-bands of a bandwidth.

In Example 51, the subject matter of example 50 or any of the Examples described herein may further include, that the two or more upstream sub-bands are adjacent to one another.

In Example 52, the subject matter of example 50 or any of the Examples described herein may further include, that at least one of the one or more downstream sub-bands is between two of the two or more upstream sub-bands.

Example 53 relates to a transceiver device (100) being configured to perform the method according to one of the examples 37 to 52, transmission circuitry (20) and receive circuitry (30), wherein the transceiver device is configured to receive a downstream signal via the receive circuitry, and to perform interference cancellation on the received downstream signal using the method.

Example 54 relates to a cable modem (100a) being configured to perform the method according to one of the examples 37 to 52, wherein the cable modem is the transceiver device.

Example 55 relates to a machine-readable storage medium including program code, when executed, to cause a machine to perform the method of one of the examples 37 to 54.

Example 56 relates to a computer program having a program code for performing the method of one of the examples 37 to 54, when the computer program is executed on a computer, a processor, or a programmable hardware component.

Example 57 relates to a machine-readable storage including machine readable instructions, when executed, to implement a method or realize an apparatus as claimed in any pending claim.

Example A1 is an apparatus configured to be employed at a cable modem, comprising: interference cancelation circuitry configured to cancel interference caused by signals from two or more US (Upstream) subbands on one or more DS (Downstream) subbands based on a linear combination of at least three kernels, wherein each of the at least three kernels comprises one or more associated terms, wherein each associated term of each kernel of the at least three kernels is in-band for one of the one or more DS subbands.

Example A2 comprises the subject matter of any variation of any of example(s) A1, wherein the two or more US subbands and the one or more DS subbands are a plurality of adjacent subbands of a bandwidth.

Example A3 comprises the subject matter of any variation of any of example(s) A2, wherein the two or more US subbands are adjacent to one another.

Example A4 comprises the subject matter of any variation of any of example(s) A2-3, wherein at least one of the one or more DS subbands is between two of the two or more US subbands.

Example A5 comprises the subject matter of any variation of any of example(s) A1-4, wherein the interference cancelation circuitry comprises a wide filter having a wide transition bandwidth.

Example A6 comprises the subject matter of any variation of any of example(s) A5, wherein the wide filter is configured to employ an FFT (Fast Fourier Transform) technique to cancel the interference.

Example A7 comprises the subject matter of any variation of any of example(s) A5, wherein the wide filter is configured to not employ an FFT (Fast Fourier Transform) technique to cancel the interference.

Example A8 comprises the subject matter of any variation of any of example(s) A1-4, wherein the interference cancelation circuitry comprises a sharp filter having a narrow transition bandwidth.

Example A9 comprises the subject matter of any variation of any of example(s) A1-8, wherein the interference cancelation circuitry is configured to upsample the linear combination of at least three kernels by at or around four times a baseband sampling rate of a single subband of the two or more US subbands.

Example A10 comprises the subject matter of any variation of any of example(s) A1-9, wherein the linear combination of the at least three kernels employs an associated weight for each kernel of the at least three kernels that is determined via an adaptive algorithm.

Example A11 comprises the subject matter of any variation of any of example(s) A1-10, wherein the at least three kernels comprises at least four kernels.

Example A12 comprises the subject matter of any variation of any of example(s) A1-11, wherein the at least three kernels comprises at most seven kernels.

Example A13 comprises an apparatus comprising means for executing any of the described operations of examples A1-12.

Example A14 comprises a machine readable medium that stores instructions for execution by a processor to perform any of the described operations of examples A1-12.

Example A15 comprises an apparatus comprising: a memory interface; and processing circuitry configured to: perform any of the described operations of examples A1-12.

The above description of illustrated examples of the subject disclosure, including what is described in the Abstract and/or the Appendix, is not intended to be exhaustive or to limit the disclosed examples to the precise forms disclosed. While specific examples and examples are described herein for illustrative purposes, various modifications are possible that are considered within the scope of such examples and examples, as those skilled in the relevant art can recognize.

In this regard, while the disclosed subject matter has been described in connection with various examples and corresponding Figures, where applicable, it is to be understood that other similar examples can be used or modifications and additions can be made to the described examples for performing the same, similar, alternative, or substitute function of the disclosed subject matter without deviating therefrom. Therefore, the disclosed subject matter should not be limited to any single example described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given or particular application.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . ." performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a signal", "means for generating a signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. An apparatus for a transceiver device, comprising:
   interference cancellation circuitry configured to cancel interference caused by upstream signals in one or more upstream sub-bands on one or more downstream sub-bands based on a combination of a plurality of kernels, wherein the interference is at least partially caused by non-linearities within a trans-mission circuitry of the transceiver device, the plurality of kernels representing the non-linearities within the transmission circuitry of the transceiver device,
   wherein each of the kernels comprises one or more associated terms, with each of the associated terms being in-band for at least one of the one or more downstream sub-bands.

2. The apparatus according to claim 1, wherein the interference cancellation circuitry is configured to cancel the interference caused by signals in two or more upstream sub-bands, wherein each of the two or more upstream sub-bands is represented separately within the kernels.

3. The apparatus according to claim 1, wherein the interference cancellation circuitry is configured to generate an estimated interference signal caused by the upstream signals using the plurality of kernels, and to cancel the interference based on the estimated interference signal.

4. The apparatus according to claim 3, wherein the interference cancellation circuitry is configured to cancel the interference within a downstream signal received by the transceiver device based on the estimated interference signal.

5. The apparatus according to claim 4, wherein the interference cancellation circuitry is configured to cancel the interference within the downstream signal by subtracting the estimated interference signal from the downstream signal.

6. The apparatus according to claim 3, wherein the interference cancellation circuitry is configured to upsample the upstream signals to an upsampling frequency, and to generate the estimated interference signal based on the upsampled upstream signals.

7. The apparatus according to claim 6, wherein the upsampling frequency is a multiple of a bandwidth of a single sub-band of the one or more upstream sub-bands.

8. The apparatus according to claim 7, wherein the plurality of kernels comprise kernels of different order, wherein the upsampling frequency is at least the bandwidth of the single sub-band of the one or more upstream sub-bands multiplied by the order of the kernel with the highest order.

9. The apparatus according to claim 1, wherein the plurality of kernels comprise kernels of different order, wherein each kernel is based on $$\varphi_k(t)=x(t)|x(t)|^{k-1}$$

where k is the order of the kernel, $\varphi_k(t)$ is the kernel of order k, and wherein a term of the kernels that is out-of-band of the one or more downstream sub-bands is omitted from the respective kernel.

10. The apparatus according to claim 1, wherein the interference cancellation circuitry is configured to cancel the interference caused by signals in a first upstream sub-band $f_1$ and in a second upstream sub-band $f_2$, wherein $$x(t)=x_1(t)e^{j2\pi f_1 t}+x_2(t)e^{j2\pi f_2 t}$$

where $x_1(t)$ and $x_2(t)$ are the respective sub-terms for the first upstream sub-band $f_1$ and the second upstream sub-band $f_2$.

11. The apparatus according to claim 1, wherein the plurality of kernels comprise kernels of different order, wherein the highest order is at least 3 and/or at most 10.

12. The apparatus according to claim 1, wherein the interference cancellation circuitry is configured to cancel the interference based on a weighted combination of the plurality of kernels.

13. The apparatus according to claim 12, wherein the interference cancellation circuitry is configured to adapt the weights of the weighted combination.

14. The apparatus according to claim 1, wherein the interference cancellation circuitry is configured to cancel the interference caused by signals in two or more upstream sub-bands, wherein the two or more upstream sub-bands and the one or more down-stream sub-band are a plurality of adjacent sub-bands of a bandwidth.

15. The apparatus according to claim 14, wherein the two or more upstream sub-bands are adjacent to one another.

16. The apparatus according to claim 14, wherein at least one of the one or more down-stream sub-bands is between two of the two or more upstream sub-bands.

17. A transceiver device comprising the apparatus according to claim 1, transmission circuitry and receive circuitry, wherein the transceiver device is configured to receive a downstream signal via the receive circuitry, and to perform interference cancellation on the received downstream signal using the interference cancellation circuitry.

18. A cable modem comprising the apparatus according to claim 1, wherein the cable modem is the transceiver device.

19. A device for a transceiver device, comprising:
means for cancelling interference configured to cancel interference caused by upstream signals in one or more upstream sub-bands on one or more downstream sub-bands based on a combination of a plurality of kernels,
wherein the interference is at least partially caused by non-linearities within a trans-mission circuitry of the transceiver device, the plurality of kernels representing the non-linearities within the transmission circuitry of the transceiver device,
wherein each of the kernels comprises one or more associated terms, with each of the associated terms being in-band for at least one of the one or more downstream sub-bands.

20. A transceiver device comprising the device according to claim 19, means for transmitting and means for receiving, wherein the transceiver device is configured to receive a downstream signal via the receive circuitry, and to perform interference cancellation on the received downstream signal using the means for can-celling interference.

21. A method for a transceiver device, comprising:
cancelling interference caused by upstream signals in one or more upstream sub-bands on one or more down-stream sub-bands based on a combination of a plurality of kernels,
wherein the interference is at least partially caused by non-linearities within a transmission circuitry of the transceiver device, the plurality of kernels representing the non-linearities within the transmission circuitry of the transceiver device,
wherein each of the kernels comprises one or more associated terms, with each of the associated terms being in-band for at least one of the one or more downstream sub-bands.

* * * * *